Nov. 21, 1961     S. D. HOLLINGER ET AL     3,009,437

WARNING DEVICE FOR GUY WIRES

Filed Feb. 5, 1960

SAMUEL D. HOLLINGER
GOLDIE R. OLSON

INVENTOR.

BY

ATTORNEY

United States Patent Office 3,009,437
Patented Nov. 21, 1961

3,009,437
WARNING DEVICE FOR GUY WIRES
Samuel D. Hollinger, Fort Worth, Tex., and Goldie R. Olson, Shreveport, La., assignors to Worth Engineering and Development Company, Fort Worth, Tex., a corporation of Texas
Filed Feb. 5, 1960, Ser. No. 6,924
3 Claims. (Cl. 116—114)

This invention relates to warning devices and has reference to a covering of enlarged profile for wires, cables and the like.

An object of the present invention is to provide means attracting attention to obstructing wires, cables, tubes and the like.

Another object of the invention is to provide a visible guard structure for cables which is light weight and easy to install.

A further object of the invention is to provide a warning device for cables and which device tends to lessen the danger of contact in that it is flexible and a non-conductor of electricity.

An additional object of the invention is to provide a warning device which is not dependent upon the angle of observation for presentation of an enlarged profile.

These and other objects will become apparent from the following description and the accompanying drawing, wherein.

Figures 1, 2, 3:
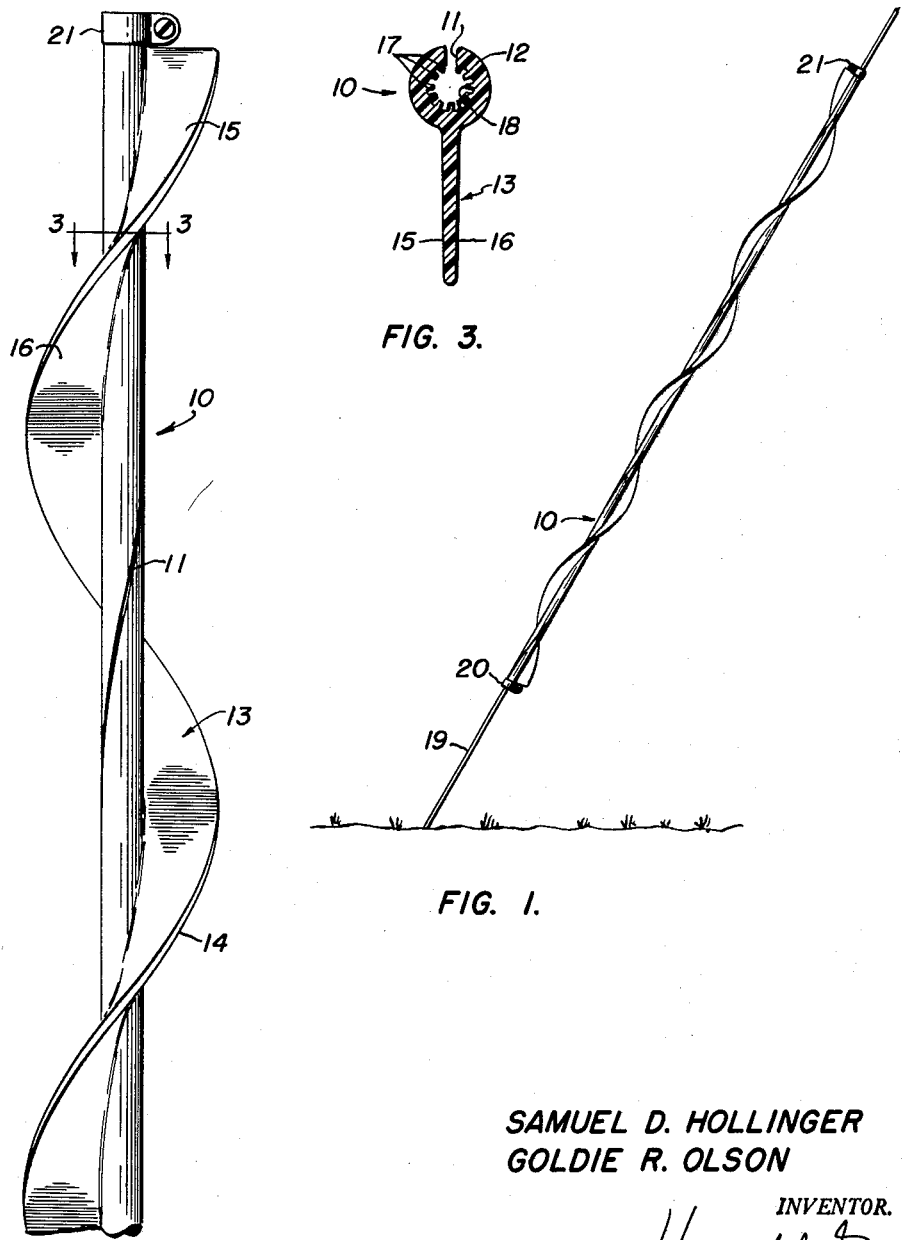
FIGURE 1 is an elevational view of the invention attached to a guy wire.
FIGURE 2 is an enlarged elevational view of the invention shown in fragment.
FIGURE 3 is a sectional view taken along line 3—3 in FIGURE 2 and is further enlarged with respect thereto.

In the drawing, an elongated flexible tube 10 is formed of a flexible insulating material such as vinyl resin or polyethylene. In a preferred embodiment of the invention, the material of construction is impregnated in its plastic state with any suitable visible light responsive fluorescent dye or pigment. A helical slot 11 is provided through the wall 12 of the tube 10 and is continuous throughout the length thereof. A spiral fin 13 is integrally formed with the tube 10 and projects perpendicularly to the axis thereof so that the outer edge 14 of the fin defines a helix coaxial with the tube and oriented 180° from the slot 11 as measured in a plane at right angles to the tube's axis. Opposite faces 15 and 16 of the fin 13 converge outwardly of the tube and appear in section (FIGURE 3) as the sides of a convexly truncated narrow isosceles triangle. A plurality of helical splines 17 are regularly spaced from one another and each projects inwardly and equidistantly of the inner surface of the tube. The pitch of each spline 17 is such that its inner edge 18 forms a constant angle with the slot 11 when measured in a plane at right angles to the principal axis of the tube 10.

A further characteristic of the invention is that the axial distance between corresponding points on a surface thereof is directly proportional to the angular distance between the points as traced on the surface and measured with respect to a plane perpendicular to the axis of the tube 10. Expressed more specifically, if:

$z$ = a coordinate corresponding to the axis of the tube 10
$x+y$ = coordinates defining a plane perpendicular to $z$ and having a common origin therewith
$P$ = any surface point on the $x$ coordinate
$k$ = distance from P to the $xy$ plane
$\theta$ = angular distance from the $x$ axis
$r$ = distance of P from the $z$ axis, then a line generated by displacement of P in terms of the angular parameter $\theta$ according to the equations.

$$x = r\cos\theta, \quad y = r\sin\theta, \quad z = k\theta$$

will lie wholly on the surface. It follows that if P' be any point exteriorly adjacent P and fixed with respect to the coordinates and if P be considered fixed in its position on the surface of the invention, then simultaneous axial rotation and longitudinal motion of the device such that the path of P obeys the given parametric equations will not remove P' from adjacence with the surface. Since this relationship holds for any and all surface points of the invention with respect to points exteriorly adjacent thereto, it is readily seen that the invention is susceptible to fabrication by extrusion. Injection and other types of molding are also possible.

For installation, a suitable length of the extruded or molded material is cut and a portion of the fin 13 is removed from opposite ends thereof. At one end of the tube 10 opposed edges of the slot 11 are then spread apart and placed around a cable 19. The tube 10 is then wrapped helically around the cable 19 and opposed edges of the slot 11 are pressed over the cable so that the cable is ultimately encompassed by the walls 12 of the tube. Suitable clamps 20 and 21 may be secured around the ends of the tube 10 to further secure the warning device on the cable 19.

The invention is not limited to the exemplary construction herein shown and described, but may be made in various ways within the scope of the appended claims.

What is claimed is:

1. A warning device for guy wires, said device comprising: a flexible tubular member, a helical slot through the tubular wall of said tubular member, means within said tubular member and extending the length thereof gripping the guy wire on which the device is mounted, and a helical flexible fin projecting outwardly of the wall of said member and disposed in a constant angular relationship to said slot with respect to the principal axis of said tubular member as measured in a plane perpendicular to said axis.

2. The invention as defined in claim 1 and including a plurality of helical splines spaced from one another and projecting inwardly of the wall of said tube and wherein each spline is disposed in a constant angular relationship to said slot with respect to the principal axis of said tubular member as measured in a plane perpendicular to said axis.

3. A warning device for guy wires, said device comprising: a flexible tubular member, a helical slot through the tubular wall of said tubular member with the axial distance between any two successive parts of said helical slot being directly proportional to the angular distance between the same two parts as measured in a plane perpendicular to the axis of said tubular member, a helical fin projecting outwardly of the wall of said tubular member and disposed in a constant angular relationship to said slot with respect to the principal axis of said tubular member, a plurality of helical splines spaced from one another and projecting inwardly of the wall of said tubular member and wherein each spline is disposed in a constant angular relationship to said slot with respect to a plane perpendicular to the principal axis of said tubular member.

References Cited in the file of this patent

UNITED STATES PATENTS

| | | |
|---|---|---|
| 1,627,423 | Bierce | May 3, 1927 |
| 2,669,012 | Bruegger | Feb. 16, 1954 |
| 2,797,510 | McLarty | July 2, 1957 |

FOREIGN PATENTS

| | | |
|---|---|---|
| 104,649 | Australia | July 22, 1938 |
| 522,819 | Great Britain | June 27, 1940 |